Dec. 12, 1950  E. ANDERSON  2,533,868
PRESSURE SEAL FOR FLANGED PIPE
Filed Nov. 30, 1949
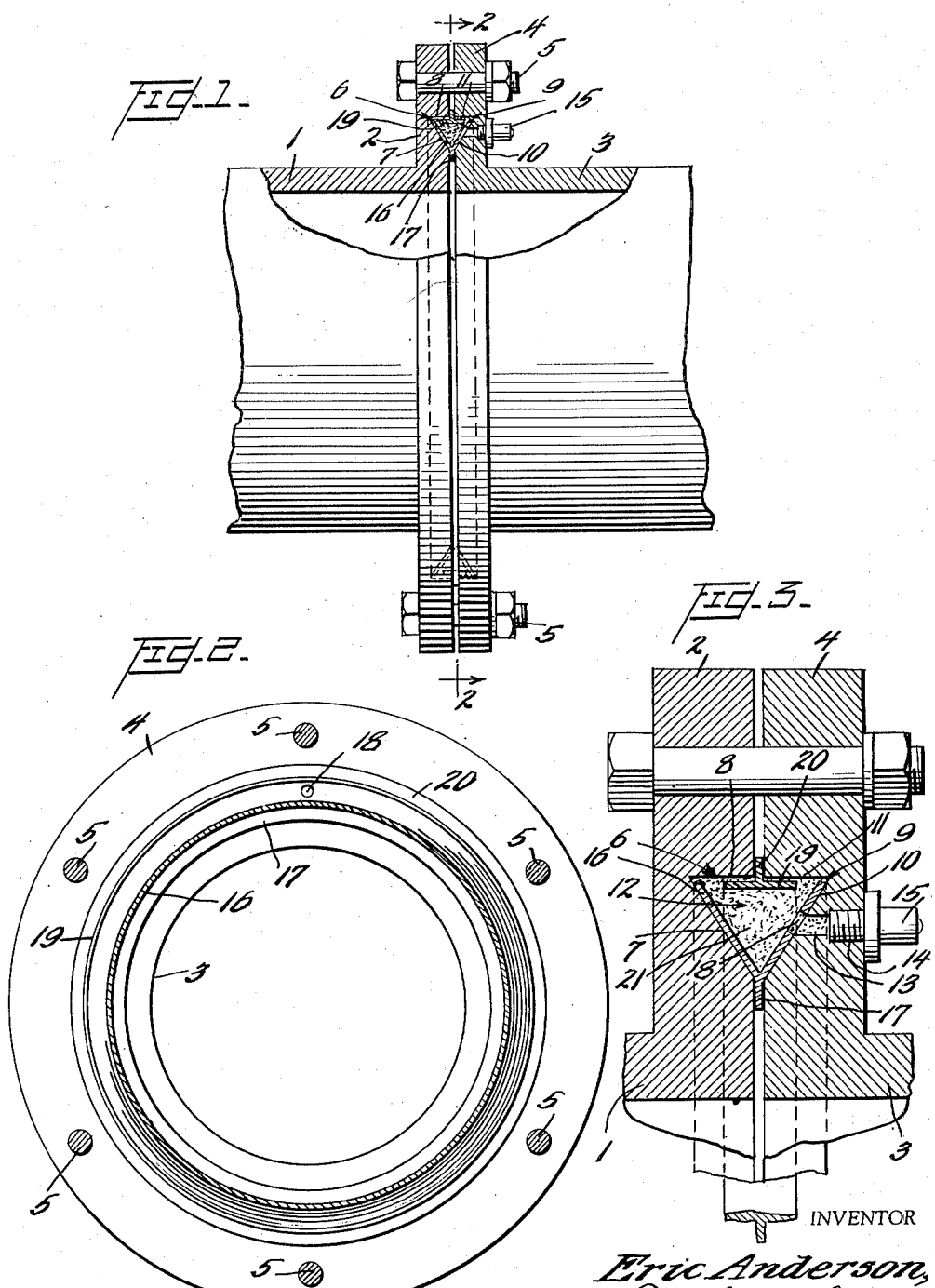
INVENTOR
Eric Anderson,
BY Parker Cook
ATTORNEY Patented Dec. 12, 1950

2,533,868

UNITED STATES PATENT OFFICE 2,533,868

PRESSURE SEAL FOR FLANGED PIPES

Eric Anderson, Trenton, N. J., assignor of one-half to Wendell H. Norris, Trenton, N. J.

Application November 30, 1949, Serial No. 130,261

3 Claims. (Cl. 285—109)

My invention relates to new and useful improvements in pressure seals for flanged pipes and has for an object to provide a flanged seal that is designed to efficiently seal against pressures, both positive and negative.

Another object of the invention is to provide a specially formed flange and seal wherein the seal does not depend upon the compression of the flanges and therefore eliminates the static preloading of the flanges, studs, etc., and consequently will not develop leaks under thermodynamic fluctuations as evidenced by creep and in loosening studs.

Still another object of the invention is to provide a flanged seal that will insure optimum sealing, without the excessive pre-loading now required by the conventional flanged joints and their gaskets.

Still another object of the invention is to provide a means of supplementing the sealing media through an orifice without in any way disturbing the flange assembly.

Still another object of the invention is to provide a seal that eliminates the conventional form of gasket but in turn is provided with two floating sealing rings, so that the fluid pressure in the pipe will cause the sides of one of the rings to be compressed to in turn exert pressure on the sealing medium hereinafter to be mentioned, and force the second of the sealing rings tightly about the annular aperture between the adjacent flanges.

Still another object of the invention is to provide a flanged pipe connection wherein the sealing media may be replenished, if ever necessary, without any way dis-assembling or separating the adjacent flanges.

Still another object of the invention is to provide a viscous compound seal that may be injected and may be set by vulcanization or polymerization; that is, vulcanization may be induced by heat applied to the flange faces, and by conductivity cause conversion of the viscous mass into a rubbery mass; or a catalyst may be added to the viscous mass, prior to injection, so that a reaction will follow and also produces a set product.

Still another object of the invention is to provide an annular cavity in which different sealing compounds may be used, depending on the chemical characteristics of the fluid to be passed through the pipes.

Still another object of the invention is to provide a pipe seal so that a medium may be used that when put under heavy negative pressure will in no way contaminate the fluid passing through the pipes.

Still another object of the invention is to provide a pipe seal wherein all the dynamic loads will be absorbed by the seal and the flanged stresses reduced to static loads only.

Still another object of the invention is to provide a pipe seal wherein the flanges may be quickly and readily machined to receive the sealing rings about to be mentioned; and wherein the sealing media may be injected under pressure after the flanged joints have been coupled.

With these and other objects in view the invention consists in certain new and novel arrangements and combination of parts as will be hereinafter more fully described and pointed out in the claims.

Referring now to the drawings, showing a preferred form,

Fig. 1 is a fragmentary portion of the flanged pipes and their seals, parts being broken away for clearness of illustration, Fig. 2 is an enlarged sectional view taken on line 2—2 of Fig. 1, and Fig. 3 is an enlarged sectional view, showing the seal and means of inserting the media.

Referring now to the drawings and for the moment to Fig. 1, there is shown to the left a fragmentary portion or section of a pipe 1 with its annular flange 2, while to the right there is shown a like section of pipe 3 with its annular flange 4. These flanges 2 and 4 are held in their registering position by a plurality of studs 5.

Referring now for the moment to Fig. 3, where these flanges 2 and 4 are shown on an enlarged scale, it will be noticed that in the face of the flange 2 there is provided an annular groove 6, the metal being removed to form the resultant diagonal wall 7 and a horizontal wall 8. In other words, the wall 7 tapers upwardly and inwardly from the face of the flange 2, as seen from the top of Fig. 3.

There is a like annular groove 9 to form the resultant wall 10 and the upper wall 11, so that when the two flanges 2 and 4 are bolted together, there is an annular chamber or recess 12 in the shape of a delta, with the apex perpendicular to the longitudinal axis of the pipe sections; while the rear wall formed by the walls 8 and 11 of the delta 12 is parallel with the longitudinal axis of the pipe sections.

The sections 1 and 3 and their flanges 2 and 4 are identical with the exception that in the flange 4 there is an aperture 13 leading from the chamber or recess 12, which aperture 13 is counterbored as at 14, and in which there is threaded the fitting 15, as is illustrated in Fig. 3.

This chamber 12 of delta shape in cross-section is formed by machining the faces of the respective flanges, or these recesses or grooves might be die cast in the flanges, or molded; and in most instances, if they are cast, they will not have to be machined; but, if desired, they may be machined to form a relatively smooth surface.

Glancing now at the several figures, there will be seen contained in the delta recess or chamber 12 an annular sealing ring 16, which is substantially Y-shaped in cross-section, the arms of the Y corresponding to the angles of the sides of the delta 12 that are formed by the two heretofore-mentioned resultant walls 7 and 10.

The stem 17 of the Y at the apex of the delta 12 extends between the two flanges 2 and 4 as clearly illustrated in Figs. 1 and 3. It will also be noticed that this Y-shaped sealing ring 16 is provided with the aperture 18 in one of its arms, which aperture 18 is in registry with the aforementioned aperture 13.

It will be noticed that the length of the arms of the Y-shaped sealing ring 16 terminate just short of the horizontal walls 8 and 11 of the delta 12, so that this Y-shaped sealing ring 16 may move or float under negative or positive pressure in the pipe line.

Also, as may be seen in the several views, there is a second sealing ring 19 of inverted T-shape, as viewed from the top of Figs. 1 and 3, the stem 20 of the T also extending between the two bolted flanges 2 and 4, and the head of the T extending into the delta 12. Thus, it will be seen that the flanges 2 and 4 are not contiguous but are slightly spaced, the amount depending on the thickness of the stem 17 of the Y-shaped ring 16 and the stem 20 of the T-shaped ring 19. The flanges 2 and 4 are separated to prevent corrosion of the metal which may happen when the flanges are contiguous.

It might be mentioned at this time that the studs 5 that are used to fasten or hold the flanges 2 and 4 together are not drawn up so tightly that they will prevent a slight movement of the Y-shaped sealing ring 16 nor the T-shaped sealing ring 19. Also, by not having these bolts tightly clamping the flanges 2 and 4 together, the bolts are subject to static mechanical loads only and do not bear shock or dynamic pressure loads, nor does the creep of the pipe impair the seal about to be mentioned.

The sealing rings 16 and 19 preferably are made of aluminum, as this metal is unaffected by free polysulphides usually found in unrefined or semi-refined petroleum products. It will be understood, however, that these rings 16 and 19 may be made of other metals, or even plastics.

After the flanges 2 and 4 and the sealing rings 16 and 19 are assembled, as above mentioned, it will be understood that the delta 12 is to be filled with a resilient and chemically suited compound 21, as will shortly be mentioned. Now, any pressure exerted against the apex and arms of the Y-sealing ring 16 will reduce the included angle and consequently compress the sealing mass, which will create a tendency to migrate to the space between the flanges 2 and 4; but the T-shaped sealing ring 19 will be forced against the horizontal walls 8 and 11 of the delta 12 to tightly seal the same and also prevent the loss of the sealing compound. This is especially true with variations of pressure in the pipe line, as for instance, when the pipe line is partly filled with gas and partly filled with liquid, as the T-shaped sealing ring 19 will have a tendency to move where the pressure is the greatest and thus complete the desired seal.

It will also be understood that when the seal is put under heavy negative pressures, the loss of any of the sealing compound is prevented by the Y-shaped sealing ring 16, as it will be drawn tightly against the angular walls 7 and 10 of the delta 12.

With the arrangement I have shown, it will be understood that the delta 12 may be filled with any desired sealing media, depending on the fluids that will be passed through the pipe line. For instance, the delta 12 may be filled with either thermoplastics or thermo-setting compounds, which in both cases will be injected by means of a pressure gun through the fitting 15.

Synthetic elastomers, such as "Hycar" or "neoprene" may be injected as viscous compounds and may be set by vulcanization or polymerization. The heat for vulcanization may be induced by applying heat to the flanged faces and thus by conductivity cause conversion of the viscous mass into a rubbery mass. On the other hand, a catalyst may be added to the viscous mass prior to injection, and a reaction follows which also produces a set sealing product.

On the other hand, if petroleum products are to be passed through the pipes, including the aromatics such as "methyl ethyl ketone," "hi-octane gasoline," etc., I may use a compound of "Thiokol" and "vinyl chloride," which will remain chemically unchanged.

Again, if a seal is to be provided against hot alcohol and its vapors, I use a mechanically stabilized colloidal mixture of "vermiculite, water and mica" or "graphite," plus powdered aluminum or copper. Under heat the "vermiculite" expands and this change in volume assists in the procuring of a seal.

Again, to seal hot caustics, a blue asbestos and neoprene viscous compound is injected which under heat will vulcanize. It might also be mentioned that for all around chemical service, "polyethylene" may be used, provided gas pressures are absent, as this product is permeable to gas but impermeable to liquids. These thermoplastic elastomers and synthetic resins are unaffected by thermo shock, and are not subject to crystallization or internal stresses such as are created in heat cured and molded compounds.

From the foregoing, it will be seen that I have provided an extremely efficient construction and seal for flanged pipe joints that are resilient in their nature, and which will insure an efficient sealing effect without the excessive pre-loading now required by conventional gasketed flanged joints.

Furthermore, means are provided for supplementing the seal through an external orifice without in any way disturbing the flange assembly.

It will also be understood that the seal does not depend upon the compression of the flanges and thus will not develop leaks under thermodynamic fluctuations. The seal is as resistant chemically as the pipe itself and permits the use of thermoplastic and pressure-sensitive sealing mediums.

Also, it permits the use of uncured compounds which may be vulcanized in situ either by induction or an external heating treatment. It will also be understood that I have found that this seal is effective in pipes of relatively small diameters as well as pipes of large diameters.

Finally, by using the arrangement and seal above outlined, it eliminates welded pipe joints. Where welding is used, at times it is necessary to blow out or clear the pipe of inflammable fluids which, however, is not necessary with my installation.

It is also unnecessary to keep on hand a large number of pre-formed gaskets, as when the flanges are uncoupled for any necessary reason, they may be quickly assembled and a sufficient amount of compound forced, with the pressure gun, in to the delta, to provide the necessary seal.

It will also be understood that I do not wish to be limited to the exact construction shown, and that many slight changes might be made without departing from the spirit and scope of the invention.

Having thus described my invention, what I claim is new and desire to secure by Letters Patent is:

1. In a pressure seal for coupled pipes, each pipe having a circular flat face flange, said flanges each having an annular groove formed in its face and the grooves forming a chamber delta shaped in cross-section when the flanges are coupled, the delta shaped chamber adapted to receive a viscous sealing compound; two annular sealing rings fitting within the delta, one of which is substantially Y-shaped and the other of which is T-shaped, and a part of each ring extending beyond the delta and between the two circular coupled flanges.

2. In a pressure seal for coupled pipes, each pipe having a circular flat face coupling flange, said flanges each having an annular groove formed in its face and the grooves forming a chamber delta shaped in cross-section when the flanges are coupled, a non-metallic viscous sealing compound in said delta shaped chamber; two annular sealing rings loosely fitting within the delta, one of which rings has two arms corresponding in angularity to the two side walls of the delta for assisting in sealing the chamber and the other of which rings has one face extending parallel with the third arm of the delta and adjacent thereto for also assisting in sealing the said chamber.

3. In a pressure seal for coupled pipes, each pipe having a circular flat face coupling flange, said flanges each having an annular groove formed in its face and the grooves forming a chamber delta shaped in cross-section when the flanges are coupled, two annular sealing rings loosely fitting within the delta, one of the rings provided with an aperture and one of the flanges provided with an inlet registering with said aperture for forcing a sealing compound, under pressure, into the said delta; one of the sealing rings having two arms and an included angle corresponding in angularity to the two side walls of the delta and lying adjacent to said walls of the delta for assisting in sealing the chamber, the other of which rings has one face extending parallel with the third wall of the delta and adjacent thereto for also assisting in sealing the said chamber, and the two flanges spaced slightly from each other.

ERIC ANDERSON.

REFERENCES CITED

The following references are of record in the file of this patent:

UNITED STATES PATENTS

| Number | Name | Date |
|---|---|---|
| 333,011 | Hoeveler | Dec. 22, 1885 |
| 1,590,580 | Hume | June 29, 1926 |